No. 782,022.                                                    Patented February 7, 1905.

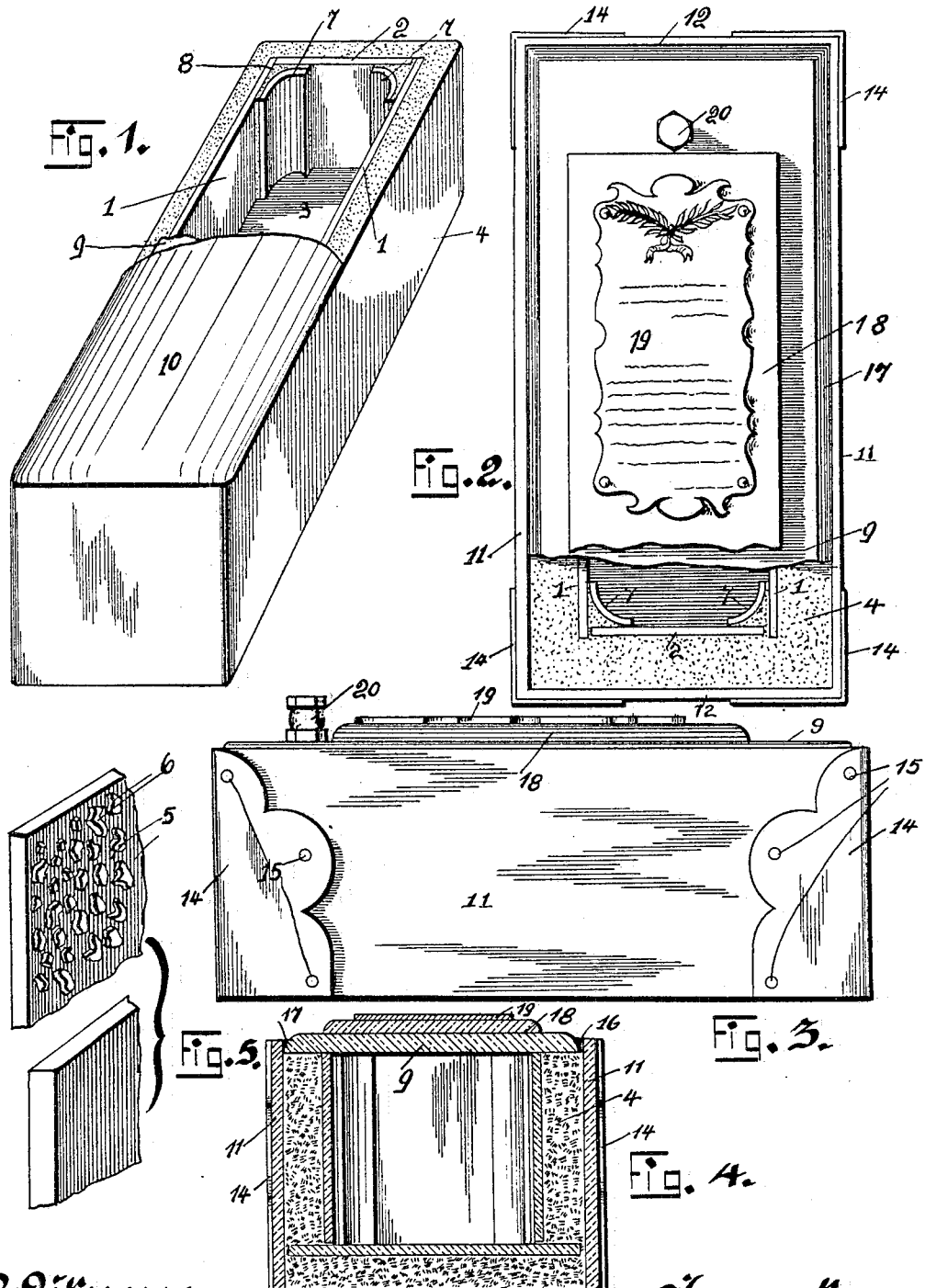

UNITED STATES PATENT OFFICE.

EDWARD P. GILLESPIE, OF ROCHESTER, PENNSYLVANIA.

BURIAL-VAULT.

SPECIFICATION forming part of Letters Patent No. 782,022, dated February 7, 1905.

Application filed September 9, 1904. Serial No. 223,915.

*To all whom it may concern:*

Be it known that I, EDWARD P. GILLESPIE, a citizen of the United States of America, residing at Rochester, in the county of Beaver and State of Pennsylvania, have invented certain new and useful Improvements in Burial-Vaults, of which the following is a specification, reference being had therein to the accompanying drawings.
This invention has relation to burial-boxes, and more particularly to that class in which the coffin or case containing the body is adapted to be placed and be hermetically sealed.

The object of this invention is to provide a novel form of box or vault which will be so constructed as to prevent vermin and other foreign ingredients from entering the box or vault and destroying the casket or case contained therein, and I have constructed the same whereby the box or vault will present a neat and attractive appearance and will withstand the rough usages to which boxes and vaults of this character are subjected.

Briefly described, the box or vault as contemplated by me comprises a plurality of slabs or plates which are arranged in a rectangular form, these slabs being supported by a cement lining, and I employ novel means for reinforcing the interior and exterior corners of the box or vault. A slab is employed to cover the box or vault after the burial-case or coffin has been placed therein, and upon this cover a suitable inscription-plate may be secured and the cover provided with a valve whereby the air within the vault after the cover has been secured thereon may be exhausted to form a vacuum to further preserve the burial-case contained therein.

The above construction, together with the details thereof, will be hereinafter more fully described, and specifically pointed out in the claims.

In referring to the drawings, Figure 1 is a perspective view of my improved box or vault, showing a portion of the top or cover thereof broken away. Fig. 2 is a top plan view of a modified form of construction embodying my invention and showing the cover thereof broken away. Fig. 3 is a side elevation of the same. Fig. 4 is a vertical transverse sectional view of the box or vault. Fig. 5 is a detail perspective view of a portion of one of the slabs or plates employed in connection with my improved box or vault.

Throughout the several views of the drawings accompanying this application similar reference-numerals designate corresponding parts.

The reference-numerals 1 1 and 2 2 indicate the sides and ends of the box or vault, which are preferably formed of slabs or plates of "opal-like" glass, these glass plates or slabs being semi-opaque and of a sufficient thickness and strength to maintain the weight to be supported within the box or vault. A bottom plate 3 is employed in connection with the side and end plates, and in forming these plates into the rectangular or oblong box or vault I employ a suitable cement 4, which after the plates have been placed in position is coated or placed around the plates forming the sides, ends, and bottom of the box. To facilitate the gripping of the cement upon the faces of these plates, I form the outer sides of the plates or slabs with roughened surfaces, as indicated at 5. This roughened surface may be formed integral with the one side of the plates, or the fragments 6 may be secured upon the plates or slabs by a suitable cement and the fragments of glass employed to form the binding medium between the cement 4 and the plates or slabs of glass. However, I do not care to confine myself to this construction, but may corrugate or serrate the glass, whereby the cement will firmly adhere to the sides of the plates or slabs. In forming the cement around the sides, ends, and bottom of the box or vault a suitable mold (not shown) may be employed, whereby the cement may be made to conform to the general shape or outline of the box or vault. To further strengthen the plates forming the sides, ends, and bottom, I employ reinforcing-strips 7, which are also preferably made of a glass-like substance, and these strips are curved, as clearly illustrated in Figs. 1 and 2 of the drawings, whereby they may be readily secured in a vertical position in the corners of the box or vault, a suitable cement 8 being employed to secure these reinforcing-strips to the sides and end plates.

The lid or cover which I employ in connection with the box or vault comprises a slab or plate of opal-like glass, as designated by reference-numeral 9. The cover is adapted to be made of a sufficient size to entirely inclose the opening formed by the end and side plates, and to secure this cover upon the box or vault I employ a cement 10, similar to that employed for securing the sides and ends of the box or vault together. The cement 10 is placed over the slab or plate 9, and it is adapted to adhere to the edges of the top of the box, this being facilitated by forming the plate or slab 9 of a smaller area than the top of the vault or box.

In Figs. 2 to 4, inclusive, I have illustrated a modified form of constructing my improved vault or box which differs slightly from that just described. The construction just described is employed, and in addition thereto in the modified form of construction opal-like glass plates are used upon the outer sides of the cement, whereby the box or vault will present a neat and attractive appearance when so constructed, and the cement will be covered and concealed from view by the glass on the outside of the same. The reference-numerals 11 12 indicate the side and end plates of glass, which are placed upon the exterior sides of the cement 4, and to further brace and protect the corners of the box or vault I employ angular metallic plates 14, which are secured by screws or pins 15 to the sides and ends of the box or vault.

The lid or cover, as illustrated in Figs. 2 and 5, inclusive, consists of a glass plate similar in construction to the slab 9 heretofore described with the exception that in securing the side and end plates 11 and 12 upon the box or vault I make the same of such a depth that a seat 16 is provided for the cover or lid, and cement 17 is placed around the edges of the cover or lid, forming an air-tight connection between the sides and ends of the box or vault and the cover. Upon the cover or lid I may secure another plate, 18, of opal-like glass, this plate being secured by any desirable cement, whereby the same will be firmly held thereon. Upon this plate 18 is adapted to be secured an inscription-plate 19, which is preferably made of a suitable metal and of any desired ornamentation. The lid or cover is formed with an opening in which a valve 20 is secured, and this valve is employed, whereby after the lid or cover has been hermetically sealed upon the box or vault the air within the box or vault may be exhausted to form a vacuum. A suitable pump may be employed to accomplish this purpose, and by withdrawing the air contained within the box or vault a vacuum is formed, whereby the burial case or coffin contained within the same will be preserved.

It will be noted from the foregoing description, taken in connection with the drawings, that I have provided a strong and durable burial-case which may be made of any desired dimensions and shape and that the construction employed will prevent all vermin, water, and air from entering the box or vault after it has been hermetically sealed and preserve the contents thereof.

While I have herein shown two forms of constructions, I do not care to limit myself to either one and may vary the construction of each without departing from the spirit and scope of the invention.

Having fully described my invention, what I claim as new, and desire to secure by Letters Patent, is—

1. As a new article of manufacture, a box or vault comprising plates of glass, said plates being secured together by cement, reinforcing-strips of glass secured to said plates at the joints of the same, a cover or lid of glass, and means for securing said cover or lid upon said box or vault.

2. As a new article of manufacture, a box or vault comprising plates or slabs of glass, said plates or slabs being secured together in a rectangular form by cement, reinforcing-strips secured to the corners of said box or vault, an outer glass covering composed of plates applied to the outer surface of the cement, a lid or cover secured upon said box or vault.

3. As a new article of manufacture a box or vault comprising plates of glass, said plates being secured together by a covering of cement, reinforcing-strips secured to the plates at the joints of the same, an outer covering composed of plates of glass applied to the outer surface of the cement, angular metallic plates attached to the outer plates at the joints of the same, and a cover or lid.

In testimony whereof I affix my signature in the presence of two witnesses.

EDWARD P. GILLESPIE.

Witnesses:
J. N. DOWELL,
JOHN C. TRIANCE.